US010967829B1

(12) United States Patent
Mills et al.

(10) Patent No.: US 10,967,829 B1
(45) Date of Patent: Apr. 6, 2021

(54) DRIVER SIDE AIRBAG MODULE

(71) Applicant: Joyson Safety Systems Acquisition LLC, Auburn Hills, MI (US)

(72) Inventors: Justin Mills, Shelby Township, MI (US); Pratik Rane, Troy, MI (US); Roland Furtado, Novi, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 21 days.

(21) Appl. No.: 16/573,628

(22) Filed: Sep. 17, 2019

(51) Int. Cl.
*B60R 21/2338* (2011.01)
*B60R 21/203* (2006.01)
*B60R 21/239* (2006.01)
*B60R 21/26* (2011.01)
*B60R 21/00* (2006.01)

(52) U.S. Cl.
CPC ........ *B60R 21/2338* (2013.01); *B60R 21/203* (2013.01); *B60R 21/239* (2013.01); *B60R 21/26* (2013.01); *B60R 2021/0048* (2013.01); *B60R 2021/23382* (2013.01)

(58) Field of Classification Search
None
See application file for complete search history.

(56) References Cited

U.S. PATENT DOCUMENTS

| | | | |
|---|---|---|---|
| 3,733,091 A | 5/1973 | Fleck et al. | |
| 5,090,729 A | 2/1992 | Watanabe | |
| 5,547,215 A | 8/1996 | Taguchi et al. | |
| 5,558,300 A | 9/1996 | Kalberer et al. | |
| 5,562,302 A | 10/1996 | Turnbull | |
| 5,718,448 A | 2/1998 | Knoll | |
| 5,720,234 A | 2/1998 | Hammer | |
| 6,019,390 A | 2/2000 | Keshavaraj | |
| 6,237,949 B1 | 5/2001 | Nozumi et al. | |
| 6,299,204 B1 | 10/2001 | Keshavaraj | |
| 7,926,840 B1 | 4/2011 | Choi | |
| 9,016,721 B1 | 4/2015 | Potter et al. | |
| 9,150,189 B1 * | 10/2015 | Nelson | B60R 21/2338 |
| 2002/0017774 A1 * | 2/2002 | Igawa | B60R 21/233 |
| | | | 280/728.2 |
| 2002/0020998 A1 | 2/2002 | Keshavaraj | |
| 2002/0043792 A1 | 4/2002 | Keshavaraj | |
| 2002/0063416 A1 | 5/2002 | Kamaiji et al. | |
| 2002/0067033 A1 | 6/2002 | Sato et al. | |
| 2002/0130493 A1 | 9/2002 | Ford et al. | |

(Continued)

FOREIGN PATENT DOCUMENTS

DE 195 44 394 A1 5/1997
DE 10 2012 006 511 A1 10/2013

(Continued)

*Primary Examiner* — Drew J Brown
(74) *Attorney, Agent, or Firm* — Gordon Rees Scully Mansukhani, LLP

(57) ABSTRACT

A driver's side airbag module for a vehicle. The airbag module includes an upper panel, a lower panel, and an extension panel. The extension panel has a varying width. A lateral tether restrains the extension panel in the lateral direction when the airbag module is deployed. The extension panel and the lateral tether create an oblong shaped airbag cushion. The airbag module also includes a lower tether that connects the lower panel and the bottom of the upper panel so that the upper panel is held on the bottom portion during deployment.

20 Claims, 7 Drawing Sheets

(56) References Cited

U.S. PATENT DOCUMENTS

| | | |
|---|---|---|
| 2003/0234520 A1 | 12/2003 | Hawthorn et al. |
| 2004/0036262 A1 | 2/2004 | Kanuma et al. |
| 2005/0087959 A1 | 4/2005 | Heuschmid et al. |
| 2005/0184499 A1 | 8/2005 | Miller |
| 2005/0230945 A1 | 10/2005 | Watanabe |
| 2006/0220364 A1 | 10/2006 | Klinkenberger |
| 2006/0232050 A1 | 10/2006 | Kumagai et al. |
| 2007/0108753 A1 | 5/2007 | Pang et al. |
| 2007/0262572 A1 | 11/2007 | Fischer et al. |
| 2008/0007036 A1 | 1/2008 | Furuno et al. |
| 2009/0121461 A1* | 5/2009 | Abe .................... B60R 21/239 280/728.3 |
| 2010/0207367 A1 | 8/2010 | Weyrich et al. |
| 2011/0001307 A1 | 1/2011 | Mendez |
| 2012/0025505 A1 | 2/2012 | Abramoski et al. |
| 2012/0049492 A1 | 3/2012 | Choi et al. |
| 2012/0205900 A1 | 8/2012 | Mallinger |
| 2013/0088056 A1 | 4/2013 | Quatanens et al. |
| 2013/0221638 A1* | 8/2013 | Hiruta ................. B60R 21/203 280/728.2 |
| 2013/0285356 A1 | 10/2013 | Fischer et al. |
| 2014/0232092 A1 | 8/2014 | Le Norcy et al. |
| 2015/0258958 A1 | 9/2015 | Belwafa et al. |
| 2017/0210326 A1 | 7/2017 | Miura et al. |
| 2018/0111581 A1 | 4/2018 | Wang et al. |
| 2018/0251093 A1 | 9/2018 | Rose et al. |
| 2018/0281731 A1* | 10/2018 | Hotta .................... B60R 21/233 |
| 2018/0281732 A1 | 10/2018 | Shigemura |
| 2018/0297548 A1 | 10/2018 | Abramoski et al. |
| 2018/0361978 A1 | 12/2018 | Belwafa et al. |
| 2018/0370478 A1 | 12/2018 | Feller et al. |
| 2019/0009754 A1 | 1/2019 | Tolda |
| 2019/0039557 A1 | 2/2019 | Barnes et al. |
| 2019/0111883 A1 | 4/2019 | Thomas |
| 2019/0193671 A1* | 6/2019 | Hotta .................... B60R 21/233 |
| 2020/0047702 A1* | 2/2020 | Wasilewska .......... B60R 21/231 |

FOREIGN PATENT DOCUMENTS

| | | |
|---|---|---|
| EP | 0 786 382 A1 | 7/1997 |
| EP | 2 145 803 A1 | 1/2010 |
| JP | 2017-65396 A | 4/2017 |
| KR | 1998-053290 | 10/1998 |
| WO | 93/17894 | 9/1993 |
| WO | 2018/04429 A1 | 11/2018 |

* cited by examiner

US 10,967,829 B1

DRIVER SIDE AIRBAG MODULE

GENERAL DESCRIPTION

The present disclosure relates to a driver side airbag module and a steering wheel including such a module. In particular, a driver's side airbag cushion with an extension panel and lateral tether to control the shape of the airbag on the lateral sides.

A vehicle, such as an automobile, includes a steering system for controlling a traveling direction. In general, an operation mechanism of such a steering system includes, for example, a steering wheel used by an occupant to control the steering angle. Current airbags may not provide enough fore-aft depth to prevent injury to the driver or passenger during high acceleration events such as a crash. Furthermore, airbags may deploy into a shape that may interfere with side curtain airbags.

The disclosed embodiments control the trajectory and shape of the airbag cushion. By controlling the cushion trajectory and speed, the performance of the airbag may be optimized. The airbag cushion provides for a greater fore-aft depth for earlier occupant engagement, while reducing interference with side curtain airbags and maintaining targeted airbag volume.

To control the trajectory of the cushion, the airbag comprises a three panel arrangement including an upper, a lower, and an extension panel. The extension panel lies between the upper and lower panels and a lateral tether is sewn to lateral sides of the extension panel. The lateral sides lie on the 3'oclock and 9'oclock positions of the extension panel when the airbag is in the deployed state. Upon deployment of the airbag, the lateral tether prevents the airbag cushion from extending laterally, allowing for a smaller lateral profile in the deployed position. Further refinement of the airbag cushion shape can be done by also having an additional lower tether to hold the upper panel.

Accordingly, an object of the present disclosure is to provide an oblong shaped cushion for a driver side airbag.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

According to one embodiment of the disclosure, a steering wheel comprises an airbag module. The airbag module comprises an inflator (not shown) and airbag. The inflator is mounted in a module housing. The module may also include a retainer for holding the inflator in position and mounting the module to a structural element of the vehicle such as, for example, the steering wheel column. The airbag includes an airbag cushion that may include a heat shield, a lateral tether, a lower tether, an upper panel, a lower panel, and an extension panel. The upper panel, the lower panel, and the extension panel define and enclose a volume of the airbag cushion. The airbag cushion comprises a lateral tether and a lower tether. The lateral tether is configured to hold the airbag cushion in the lateral direction during deployment in a high acceleration event such as a crash. The lateral tether is sewn onto the extension panel of the airbag cushion at the lateral sides at the 9 o'clock and 3 o'clock position. The lower tether is configured to hold the airbag cushion in the aft direction at the bottom of the upper panel at the 6 o'clock position, during deployment in a high acceleration event. The combination of the lateral and lower tethers creates an airbag cushion shape optimized for passenger safety during high acceleration events.

Figure 1:
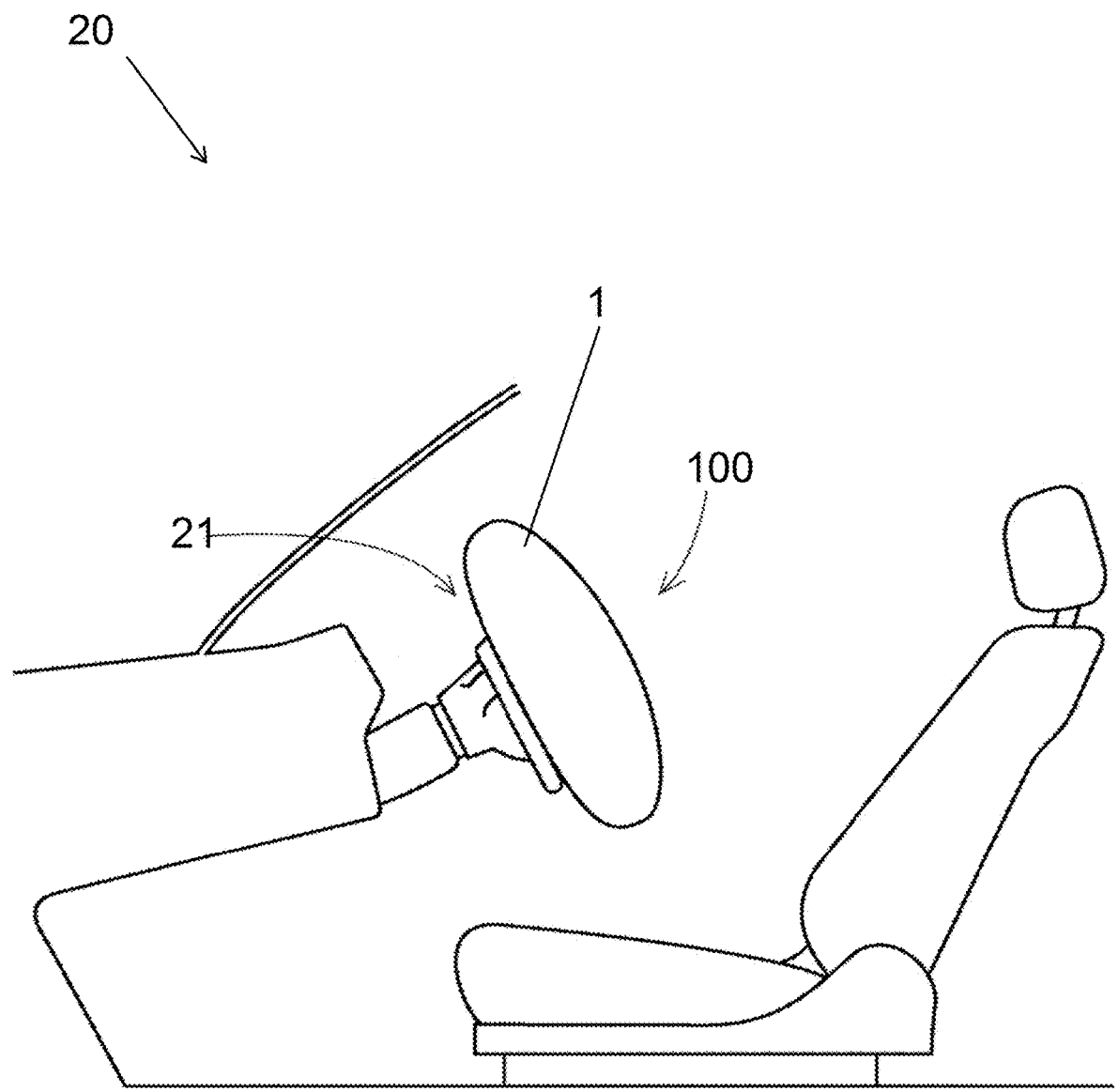
FIG. 1 is a passenger compartment of a vehicle with an exemplary driver side airbag module.

FIG. 1 illustrates a vehicle 20 and a steering wheel 21 comprising a deployed driver side airbag module 100 with an inflated cushion 1.

Figure 2:
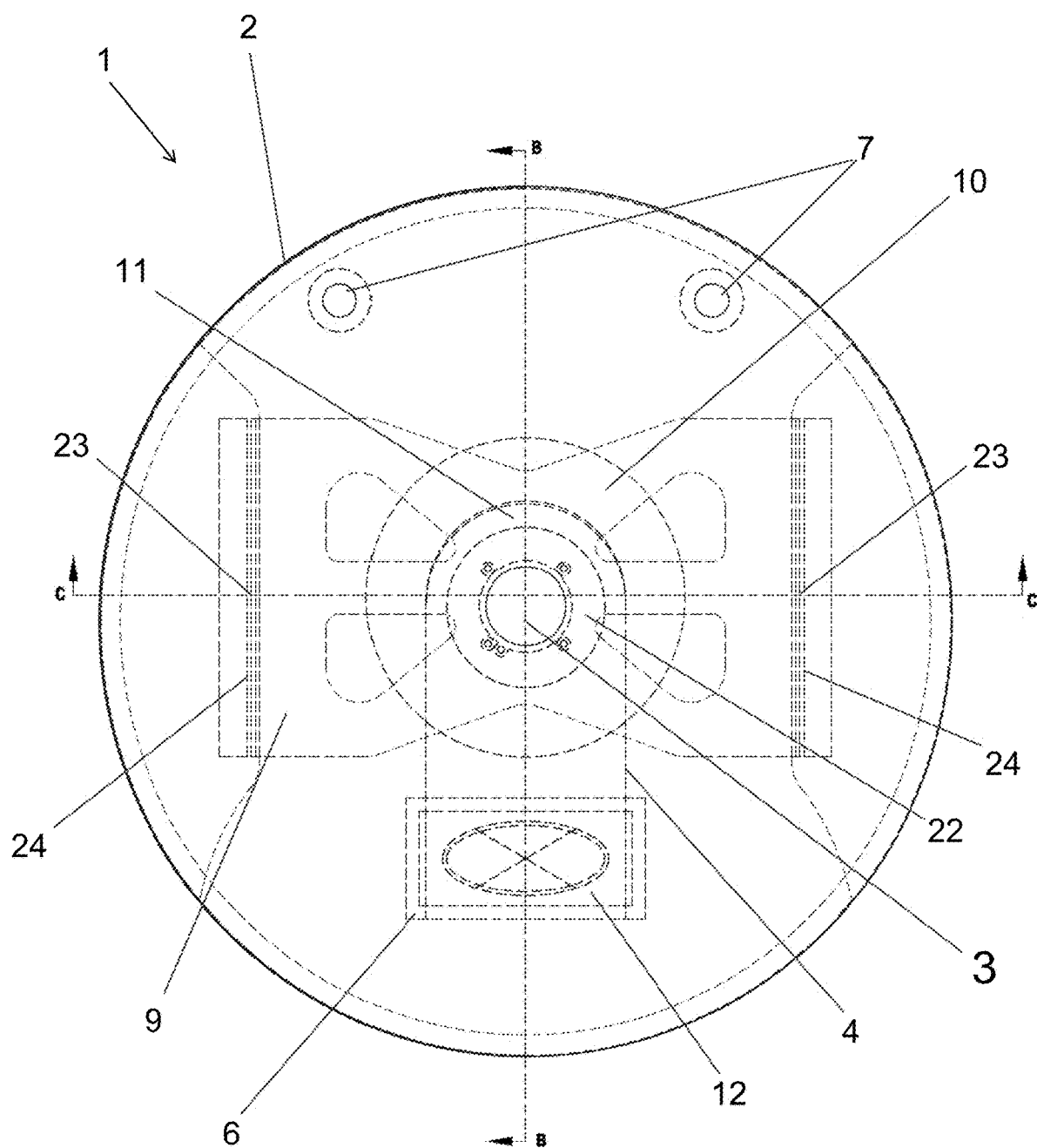
FIG. 2 is a rear view of the driver side airbag cushion.
Figure 3:
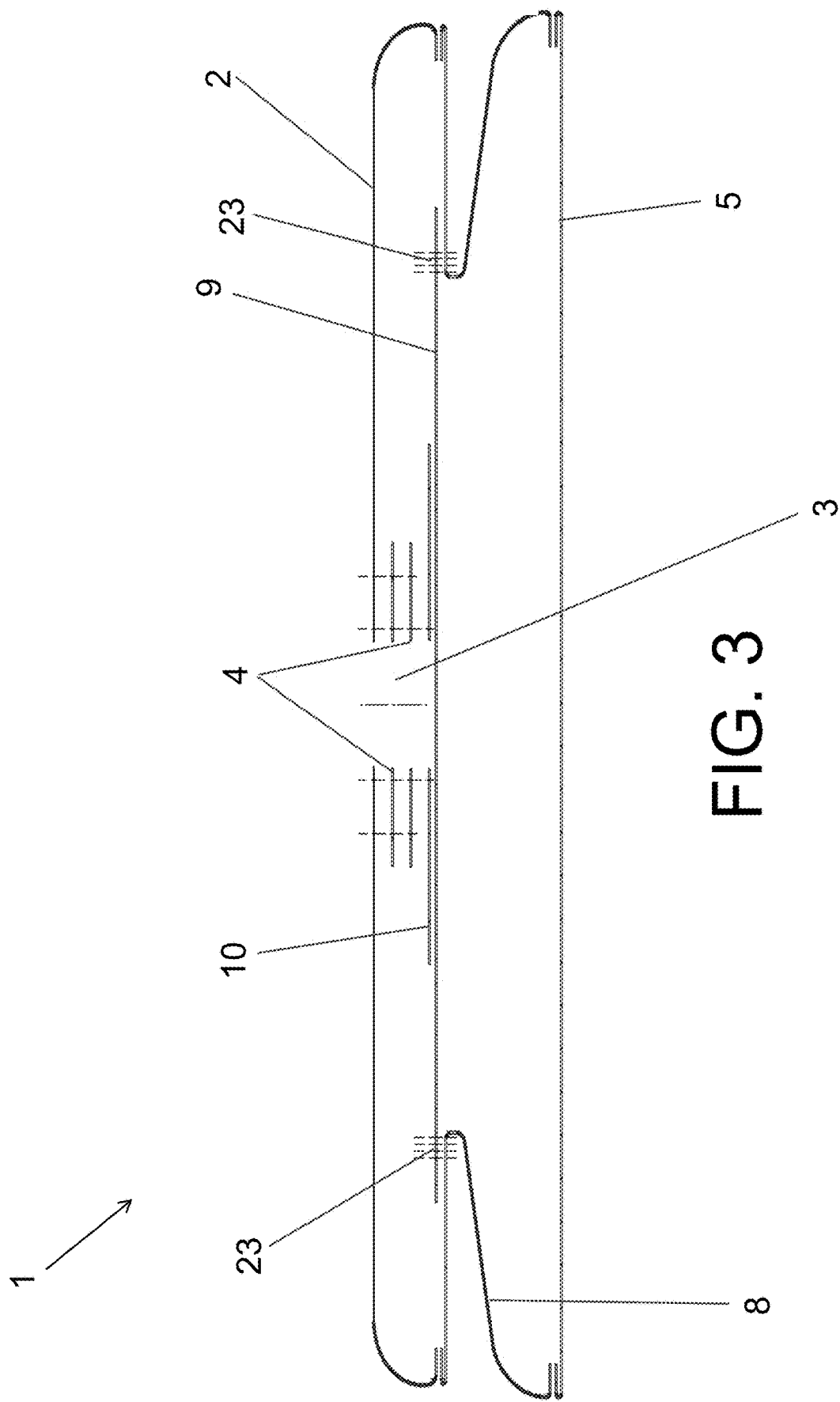
FIG. 3 is a sectional view C-C of the airbag cushion.

FIGS. 2 and 3 illustrate a rear view of the airbag cushion 1 and section C-C, respectively. The airbag cushion 1 includes a lower panel 2. The lower panel includes an opening 3 for receiving the inflator. The lower panel 2 is connected to at least one lower tether 4. The lower tether 4 is sewn onto the lower panel 2 and may optionally include multiple lower tethers 4 which may be sewn together at a first end 11. The lower tether may be anchored adjacent to the lower panel at the opening 3 to a retainer (not shown) disposed adjacent to the opening 3. The retainer may be used to secure all of the fabric panels in position. The first ends 11 of the lower tethers 4 are disposed between a heat shield 10 and the lower panel 2 proximate the opening 3 of the lower panel 2. The heatshield 10, first ends 11 of lower tethers 4, and lower panel 2 may be sewn together. A second end 12 of the lower tethers 4 is connected to a bottom portion (6 o'clock position) of the upper panel 5. The upper panel 5 is located closest to the passenger. The lower tether restrains the upper panel during airbag deployment from fully extending so that the bottom portion of the upper panel is held aft relative to other portions of upper panel 5. A reinforcement panel 6 may be connected to the upper panel 5 disposed between the lower tether 4 and the upper panel 5. Airbag vents 7 are disposed on the lower panel to control the deceleration over time of the passenger after deployment of the airbag. Airbag vents 7 may also be disposed on the extension panel. Different deceleration profiles may be provided depending on the placement of the vents 7. Sewing threads 24 are disposed to attach the panels and tethers.

The extension panel 8 is located between lower panel 2 and upper panel 5. The extension panel 8 may be connected to the lower panel 2 at the extension panel aft end and to the upper panel 5 at the extension panel forward end. The extension panel 8 may be sewn to both upper panel 5 and lower panel 2. A lateral tether 9 is connected to the extension panel 8 at lateral attachment regions 23 of the extension panel. The attachment regions 23 for the lateral tether 9 on the sides of the airbag cushion may be located at the 3 o'clock and 9 o'clock positions of the airbag cushion. The lateral tether 9 may alternatively be connected to the extension panel 8 at other locations, as described further below. The different locations of attachment of lateral tether 9 to extension panel 8 allows for different airbag shapes as required by different vehicle safety configurations. The lateral tether may be sewn to the extension panel. The lateral tether prevents the extension panel from expanding in the lateral direction when the airbag cushion 1 is deployed. The lateral tether restrains the expansion of the airbag cushion to create an oblong shaped airbag cushion in the deployed position. This shape allows for greater fore-aft depth for earlier occupant engagement while reducing interference with the side curtain airbags and maintaining targeted airbag cushion volume. The ends of lateral tether of the airbag may be secured to the extension panel at different locations, for example, at the 2 o'clock and 8 o clock positions. The attachment regions for the lateral tether do not have to be opposite or symmetrically located on the airbag. For example, the lateral tether may be secured at attachment regions on the extension panel located at the 10 o'clock position and 2 o'clock position or the 11 o'clock position and the 7 o'clock position of the airbag. The shape of the airbag may be modified by adjusting the attachment regions of the lateral tether to accommodate different vehicle configurations. The heat shield 10 is placed between the lateral tether 9 and the lower tethers 4 to prevent hot gases from the inflator 22 from damaging the upper panel 5 and the lateral tether 9.

Figure 4:
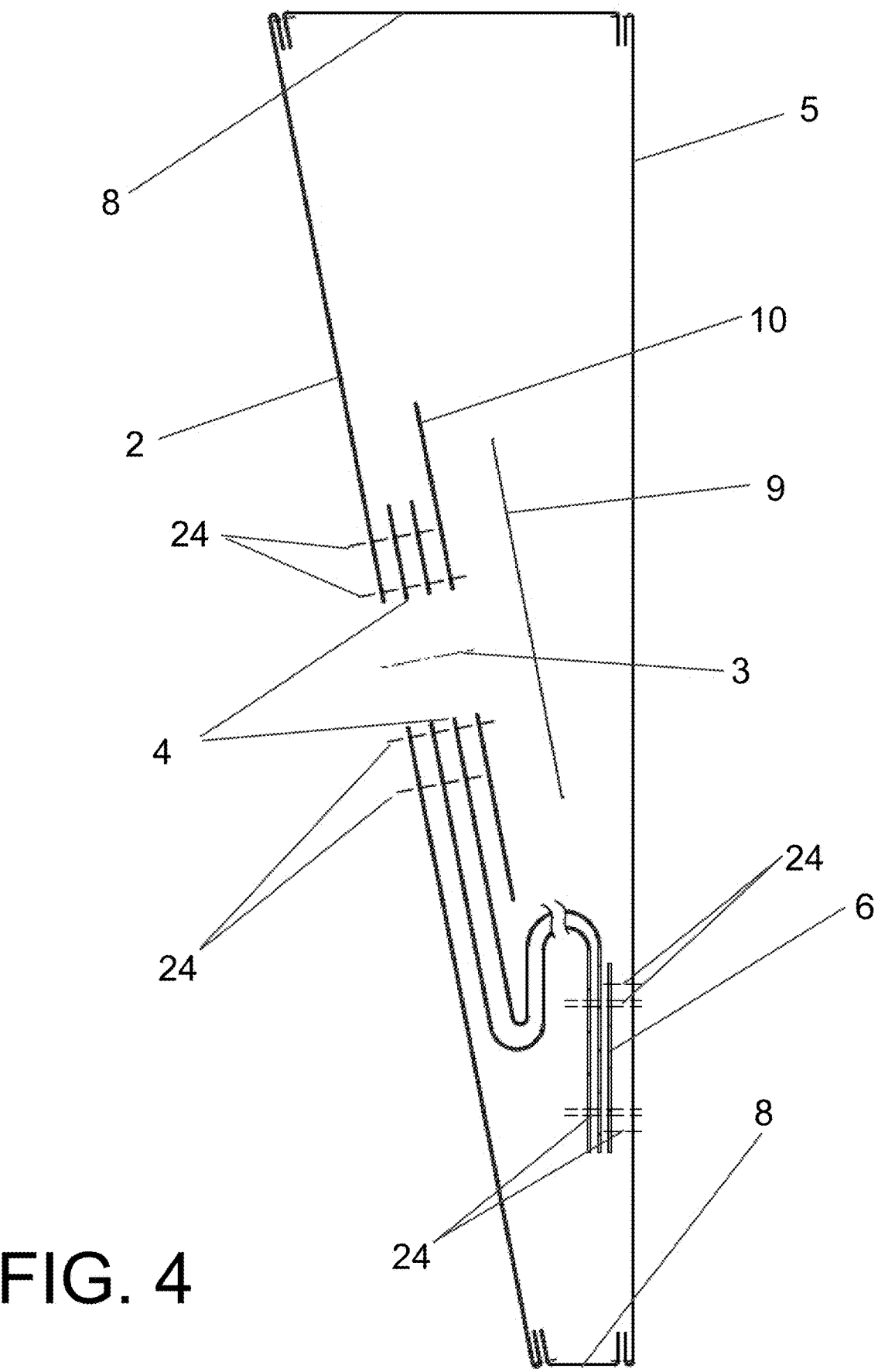
FIG. 4 is a sectional view B-B of the airbag cushion.
Figure 8:
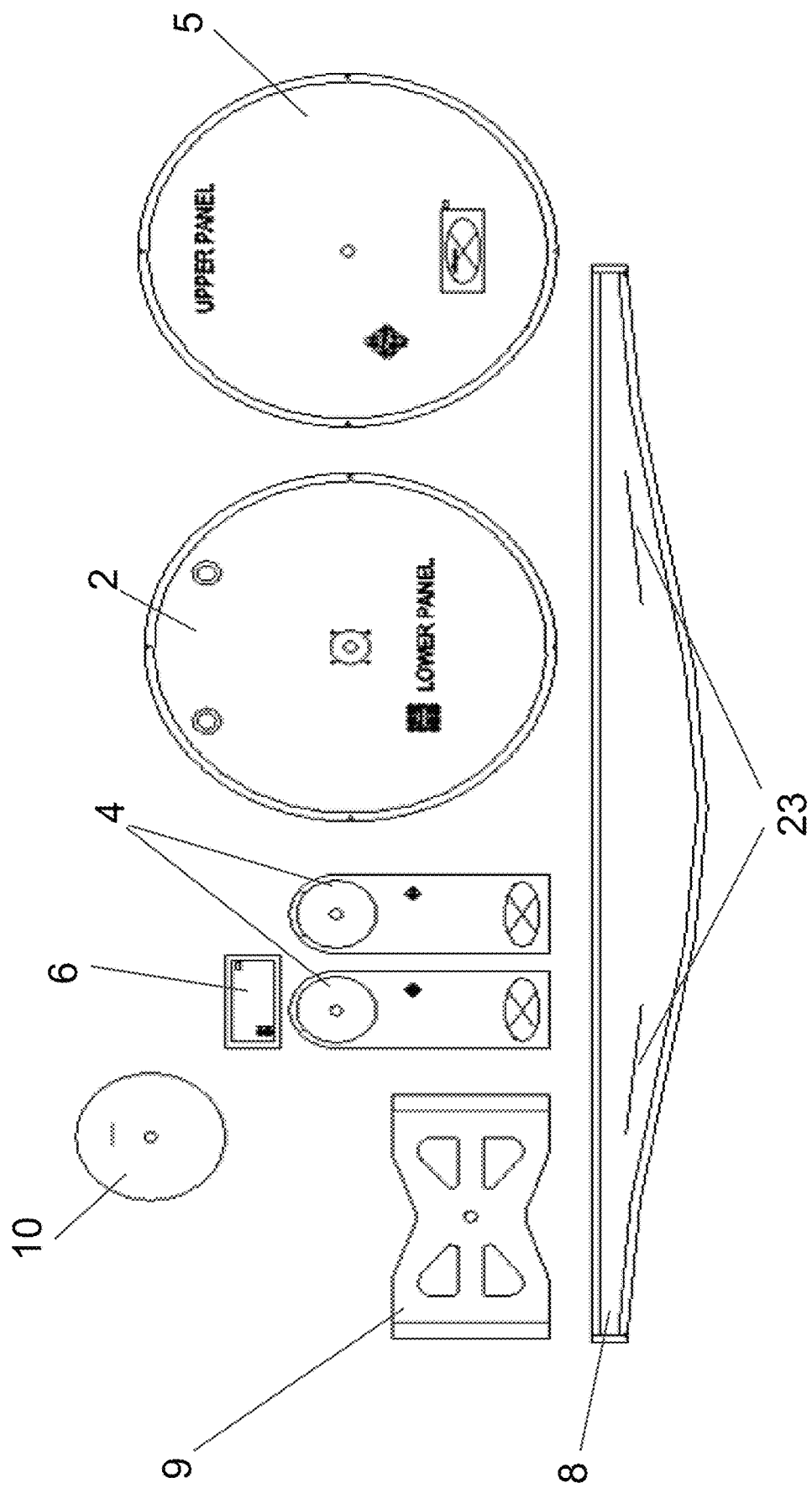
FIG. 8 is a cut set showing the fabric panels that form the airbag cushion.

FIG. 4 illustrates section B-B as labeled in FIG. 2. Reinforcement panel 6 is configured to prevent the upper panel 5 from ripping or detaching from the lower tether 4 at the second end 12 upon deployment of the airbag. Reinforcement panel 6 may be sewn onto the upper panel 5. The lower tethers 4 may be sewn together onto the reinforcement panel 6 and the upper panel 5. Sewing threads 24 are disposed for sewing the reinforcement panel 6 to the upper panel 5 and the lower tethers 4. The perimeter of extension panel 8 follows the perimeter of the upper panel 5 and lower panel 2. The width of the extension 8 panel varies along the perimeter of the panel as shown in FIG. 8. In the exemplary embodiment shown, the width of the extension panel at the 12 o'clock position is wider than the width of the extension panel at the 6 o'clock position. This exemplary shape of the extension panel 8 allows for greater fore-aft depth at the upper 12 o'clock position with the widest portion of extension panel 8 relative to the bottom 6 o'clock position with the narrowest portion of the extension panel 8. The width of the extension panel may be modified to allow different cushion shapes during deployment. For example, the widest portion of the extension panel may occur at the 3 o'clock position and the narrowest portion of the extension panel may occur at the 9 o'clock position. In addition, the width may be varied so that widest and narrowest portions of the panel are not located on opposite sides of the airbag cushion. The width variation and width profile of the extension panel along its perimeter may be tailored to different vehicle configurations. The width as described herein is defined as the dimension of the extension panel 8 that extends from the forward end of the lower panel 2 to the aft end of the upper panel 5.

Figure 5:
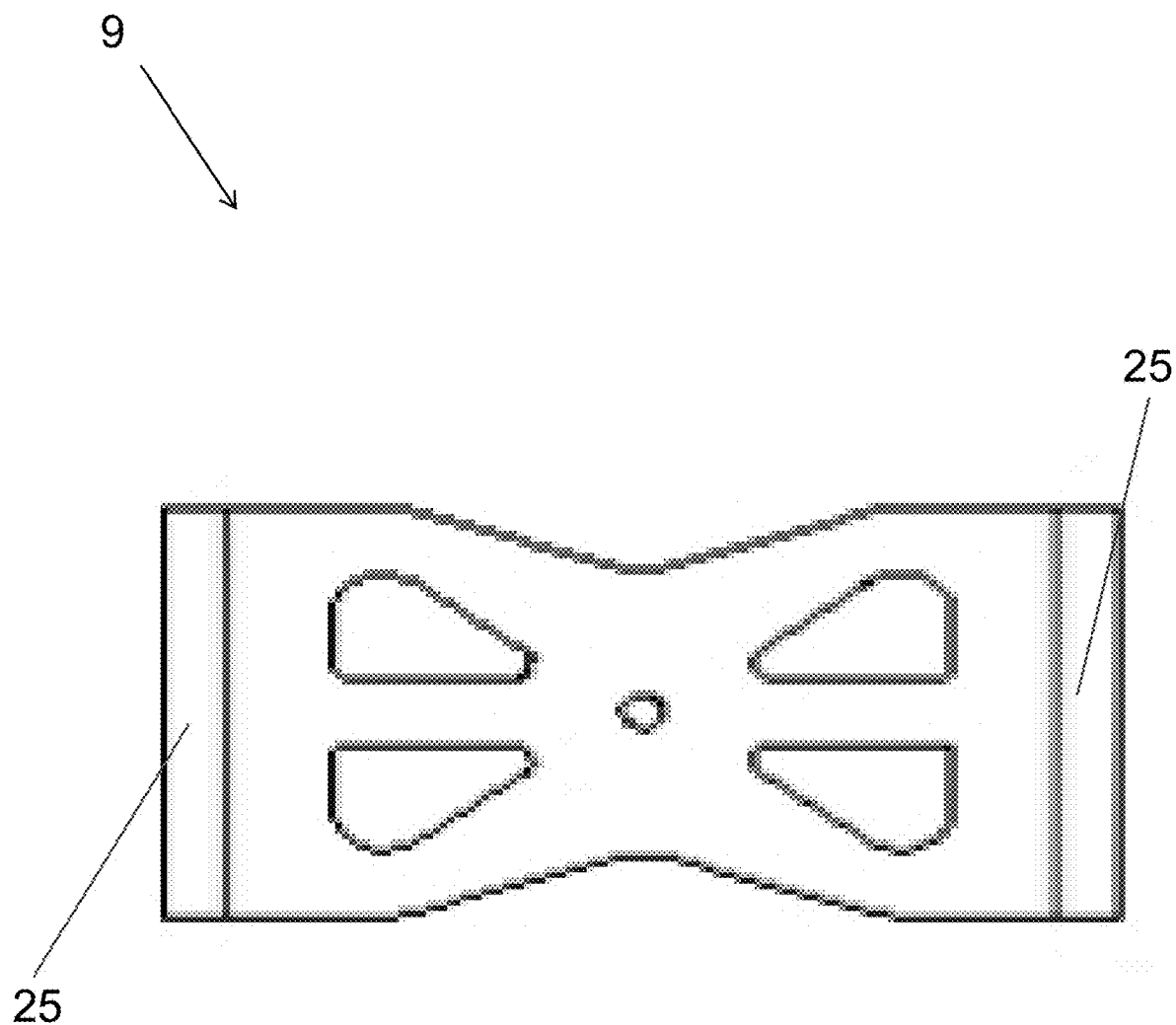
FIG. 5 is an isolated view of the lateral tether.

FIG. 5 illustrates an exemplary lateral tether 9. The lateral tether 9 extends in the lateral direction relative to the deployed airbag cushion. The lateral tether may have a bow tie shape. The lateral tether may be connected to the extension panel 8 by sewing the lateral sides 25 of the lateral tether to the attachment regions 23 on the extension panel 8.

Figure 6:
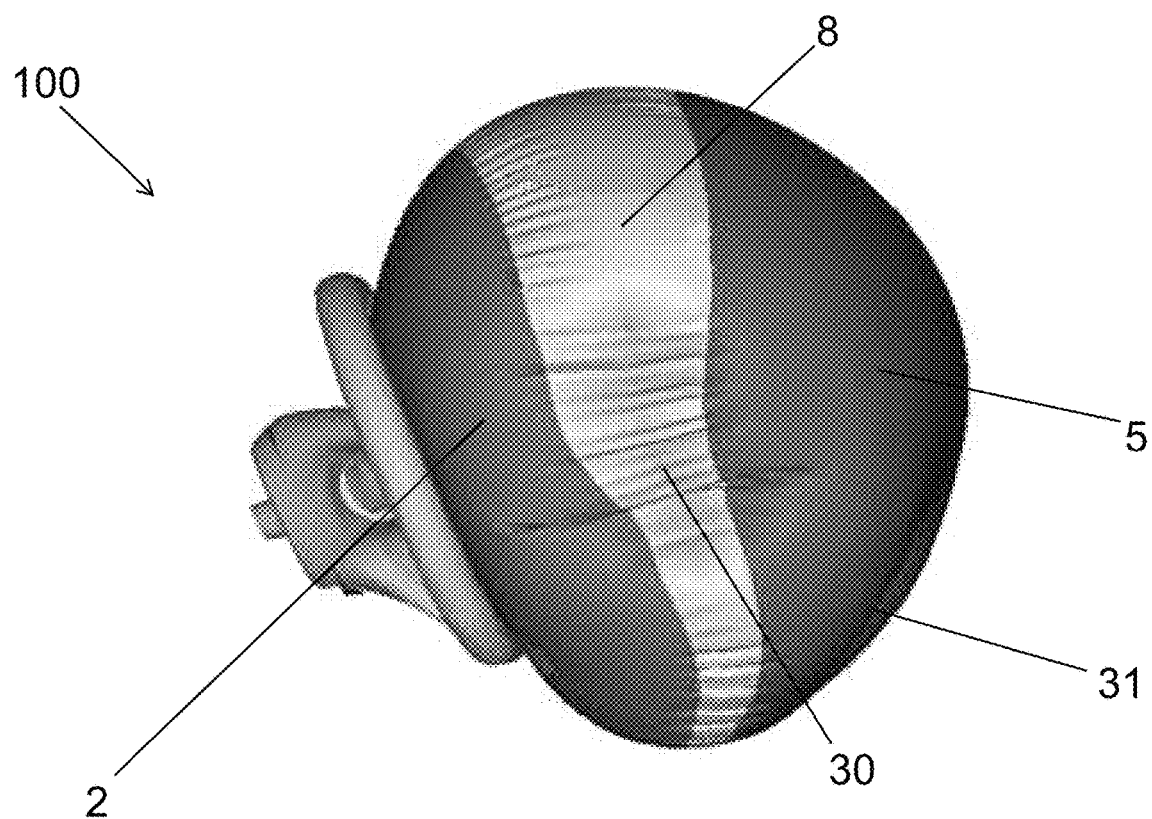
FIG. 6 is a side view of the deployed airbag module.
Figure 7:
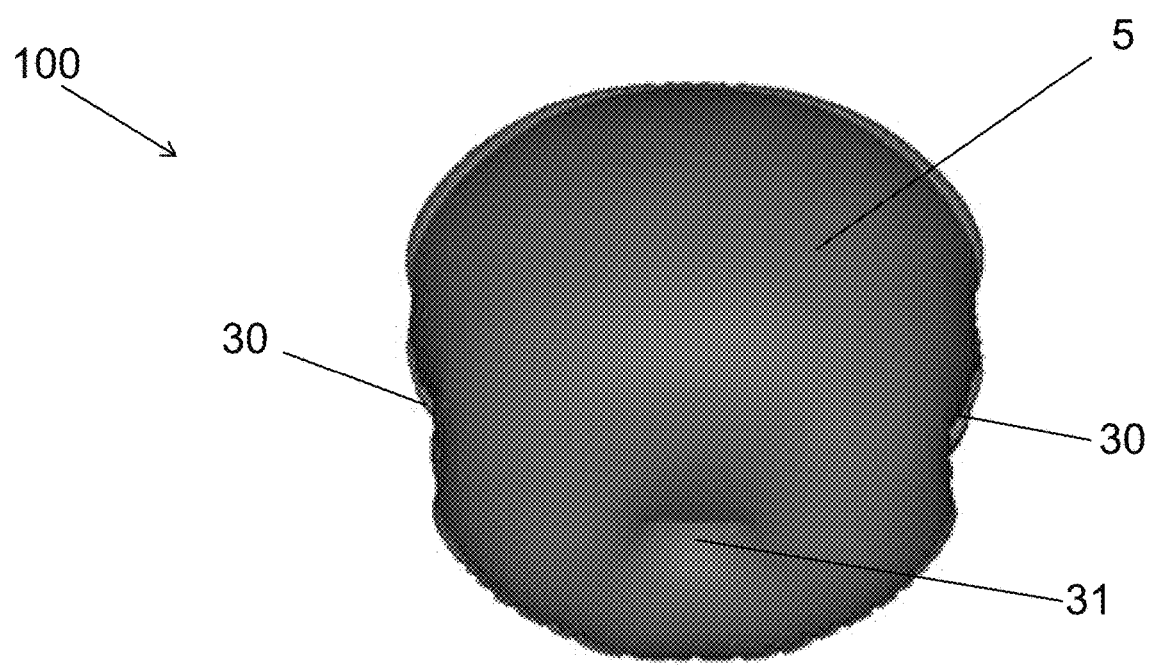
FIG. 7 is a front view of the deployed airbag module.

FIGS. 6 and 7 are a side view and a front view, respectively, of a deployed airbag module 100. The lower panel 2 may be secured to the inflator or airbag module housing and is sewn onto the extension panel 8 which is located forward of the lower panel 2. Extension panel 8 is sewn onto the upper panel 5 and is located aft of the upper panel 5. A dimple 30 is located at the lateral sides of the deployed airbag at the extension panel 8. Lateral dimples 30 are created from the lateral tether 9 holding the extension panel at the laterals sides (3 o'clock and 9 o'clock positions). The lower tethers 4 hold the bottom of upper panel 5 and create forward dimple 31.

FIG. 8 shows an exemplary cut set for the fabric portion of the airbag module. The pieces shown in FIG. 8 are an exemplary non-limiting embodiment. The number of lateral and lower tethers may be tailored depending on the required airbag shape in order to accommodate different vehicle safety requirements and constraints.

The lower panel 2, upper panel 5, extension panel 8, lateral/lower tethers 9/4, and reinforcement panel 6 may be made of fabric with enough strength to endure high acceleration and temperatures of hot gases from the inflator during deployment in a high acceleration event. Tether attachment locations described above are exemplary and are non-limiting. Tether attachment locations for the lateral tether 9 and the lower tethers 4 may be tailored to different vehicle configurations.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag module as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An airbag module comprising:
a cushion, wherein the cushion comprises a lower panel, an upper panel, and an extension panel;
wherein the extension panel is located between the lower panel and the upper panel, and is connected to the perimeter of the lower panel and the perimeter of the upper panel; and
an inflator configured to provide inflation gas to the cushion; and
a lateral tether connected to the extension panel at first and second lateral sides of the extension panel, wherein the lateral tether is configured to restrain the extension panel in the lateral direction at the first and second lateral sides when the inflator inflates the cushion.

2. The airbag module of claim 1, further comprising a lower tether anchored adjacent to the lower panel at a first end and connected to the upper panel at a second end.

3. The airbag module of claim 2, wherein the lower tether is connected at a bottom portion of the upper panel, wherein the lower tether is configured to restrain the bottom portion of the upper panel when the inflator inflates the cushion.

4. The airbag module of claim 3, further comprising a secondary tether disposed in tandem with the lower tether.

5. The airbag module of claim 1, wherein the airbag cushion includes at least one vent for allowing inflation gas to escape the airbag cushion.

6. The airbag module of claim 5, wherein the at least one vent is located on the lower panel.

7. The airbag module of claim 5, wherein the at least one vent is located on the extension panel.

8. The airbag module of claim 2, further comprising a reinforcement panel between the lower tether and the upper panel, wherein the reinforcement panel is connected to the upper panel.

9. The airbag module of claim 1, wherein the extension panel varies in width along the perimeter of the cushion.

10. The airbag module of claim 9, wherein the extension panel is positioned so that the narrowest portion of the extension panel is located at the bottom center of the airbag when the airbag deploys.

11. The airbag module of claim 9, wherein the extension panel is positioned so that a widest portion of the airbag is located at the top center of the airbag when the airbag deploys.

12. A driver side airbag module comprising:
a cushion, wherein the cushion comprises a lower panel, an upper panel, and an extension panel;
wherein the extension panel is located between the lower panel and the upper panel, and is connected to the perimeter of the lower panel and the upper panel;
an inflator configured to inject gases into the cushion;
a lateral tether connected to the extension panel at first and second lateral sides of the extension panel, wherein the lateral tether is configured to hold the extension panel in the lateral direction when the inflator inflates the cushion.

13. The driver side airbag module of claim 12, further comprising a lower tether anchored adjacent to the lower panel at a first end and connected to the upper panel at a second end.

14. The driver side airbag module of claim 12, wherein the extension panel varies in width along the perimeter of the cushion.

15. The airbag module of claim 14, wherein the extension panel is positioned so that the narrowest portion of the extension panel is located at the bottom center of the airbag when the airbag deploys.

16. The driver side airbag module of claim 13, wherein the lower tether is connected at a bottom portion of the upper panel, wherein the lower tether is configured to hold the bottom portion of the upper panel when the inflator inflates the cushion.

17. An airbag cushion comprising:
a lower panel, an upper panel, and an extension panel;
wherein the extension panel is between the lower panel and upper panel;
wherein the lower panel comprises an opening for an inflator configured to inject gas into the cushion, the lower panel, the upper panel, and the extension panel create an inflatable chamber configured to enclose the gases from the inflator; and
a lateral tether connected to the extension panel at first and second lateral sides of the extension panel, wherein the lateral tether is configured to hold the extension panel in the lateral direction when the inflator inflates the cushion.

18. The airbag cushion of claim 17, further comprising a lower tether anchored adjacent to the lower panel at a first end and connected to the upper panel at a second end.

19. The airbag cushion of claim 16, wherein the extension panel varies in width along the perimeter of the cushion.

20. The airbag cushion of claim 19, wherein the extension panel is positioned so that a widest portion of the airbag is located at the top center of the airbag when the airbag deploys.

* * * * *